United States Patent [19]

Suchard

[11] 3,854,303
[45] Dec. 17, 1974

[54] AIR-CONDITIONING SYSTEM FOR MOTOR VEHICLES

[76] Inventor: Luis Suchard, 2332 Portland St., Los Angeles, Calif. 90007

[22] Filed: Nov. 3, 1972

[21] Appl. No.: 303,596

[52] U.S. Cl. .................................. 62/426, 62/426
[51] Int. Cl. ............................................ F25d 17/06
[58] Field of Search .............................. 62/426, 244

[56] References Cited
UNITED STATES PATENTS

| | | | |
|---|---|---|---|
| 1,870,460 | 8/1932 | Lambert | 62/426 |
| 1,991,897 | 2/1935 | Higgins | 62/426 |
| 2,148,238 | 2/1939 | Krackowizer | 62/426 |
| 2,318,393 | 5/1943 | Honerkamp | 62/426 |
| 2,740,268 | 4/1956 | Jones | 62/426 |
| 3,007,323 | 11/1961 | Millington | 62/426 |
| 3,483,713 | 12/1969 | Cole | 62/426 |

Primary Examiner—William J. Wye
Attorney, Agent, or Firm—Bernard M. Smukler

[57] ABSTRACT

A system for conditioning air so that same may be efficiently cooled, said system having many of the components usually found in units generally adapted to condition air, but in addition thereto means are provided by which uncooled air is first passed over the exterior surfaces of at least one or more of the cooling coils so that the temperature of said air becomes somewhat lowered, and then said air is passed through the core of such coils for the final temperature reduction process.

2 Claims, 9 Drawing Figures

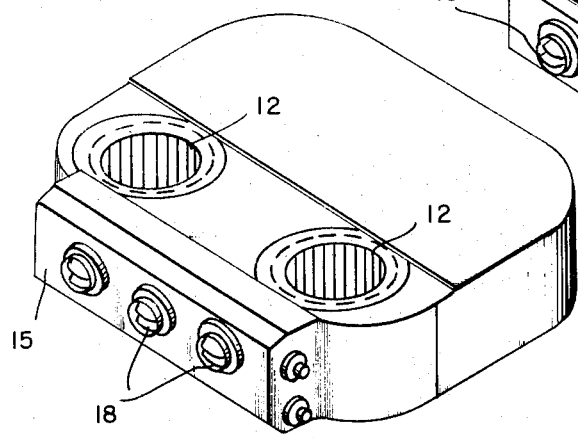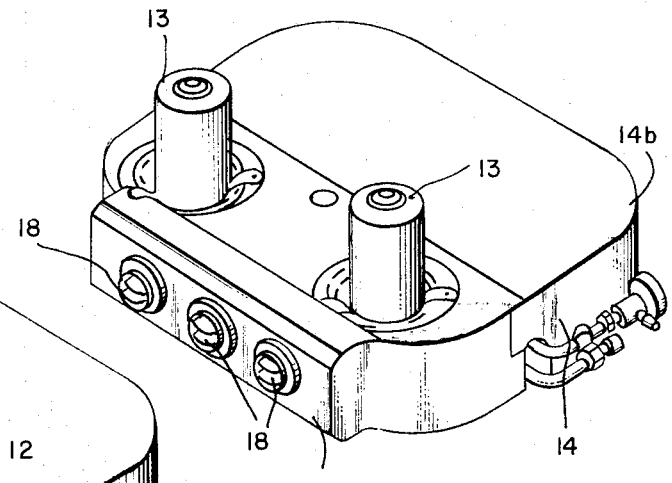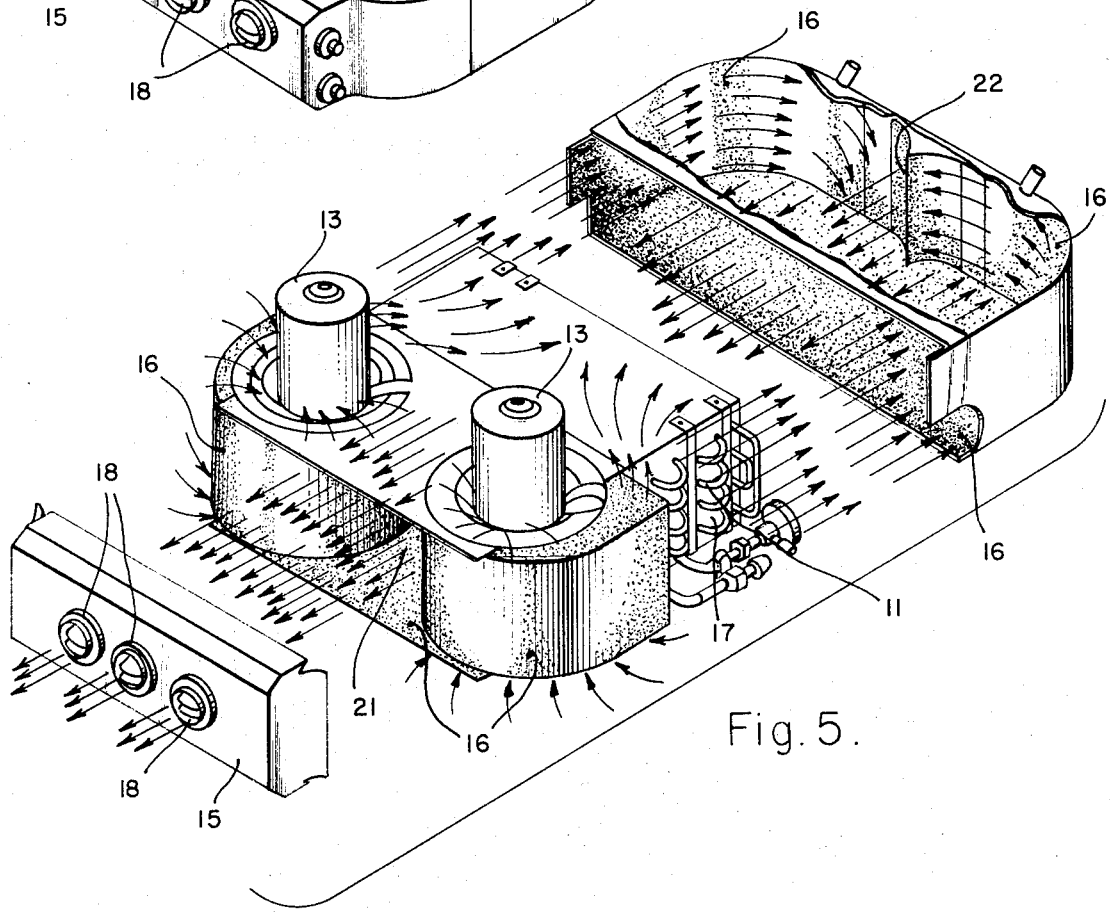

AIR-CONDITIONING SYSTEM FOR MOTOR VEHICLES

The invention relates in general to a system for cooling air, and more particularly to a system which includes means for initially passing uncooled air over the exterior surfaces of cooling coils as such air enters the apparatus thereof, and then passing said air through the interior core surfaces of such coils before expulsion of same into the surrounding atmosphere. In addition, the system includes universal louvers which are adapted to be removable and replaceable within any operative air conditioning system. Further, said system is adapted to be used in air-conditioning units for buildings, houses, rooms and particularly motor vehicles. In operation, an apparatus constructed in accordance with the invention will, among other things, quickly and easily cool air to any desired temperature above five degrees Fahrenheit and prevent the phenomenon of the cooling coils becoming "frozen" at a temperature slightly above 0° Fahrenheit.

Air conditioning systems are not particularly novel. Such systems frequently utilize cooling coils formed in the shape of hollow cylinders. Uncooled air is thereupon passed directly into the apparatus through the core surfaces of said coils so that such air becomes somewhat cooled after completion of the passage and expulsion into the surrounding atmosphere. As may be appreciated, however, such methods only utilize essentially one-half of the available time and surface area for cooling purposes. As a result, because the exterior surfaces of said coils do not at any time receive a draft of warm air, there is reduced efficiency in lowering the temperature thereof and such coils tend to "freeze" when the temperature thereof approaches 32° Fahrenheit. Further, it is well known that in automobiles, the louvers for air conditioning devices placed therein require several different designs and construction. Such multiple designs and construction are necessary because placement of the louver outlets is found on dashboards having many non-symmetrical and non-flat surfaces. As will hereafter be appreciated, the present invention obviates the above problems by first utilizing all surfaces of said cooling coils by providing two distinct circulation procedures for uncooled air entering the apparatus, so that a maximum cooling effect is obtained and "freezing" of the coils above 0° Fahrenheit is prevented. In addition, the louvers of the present invention are so designed as to permit their placement in any outlet provided on any vehicular dashboard, regardless of the location thereof. As a result, the louvers of the present invention are replaceable by similarly designed louvers, regardless of the make or year of any particular vehicle.

With the foregoing in mind, it is the primary object of the present invention to provide an air conditioning apparatus having means by which air within such apparatus can be cooled by two distinct operations before same is emitted from said apparatus.

A further object of the present invention is to provide an air conditioning system with means by which uncooled air first passes adjacent the exterior surfaces of cooling coils and thereafter through the cores of such coils before emitting the cooled air into a room or automobile compartment.

Another object of the present invention is to provide an air conditioning system adapted for use in a motor vehicle, which system permits the efficient cooling of air within the automobile compartment, all without producing undue tension on the motor, belts and the like.

An additional object of the present invention is to provide a universal louver adapted for use and replacement in substantially all air conditioning systems, particularly those found in motor vehicles, regardless of the design or configuration or placement of the louver outlets for such systems.

Further and additional objects and advantages of the present invention include having an air conditioning system adapted to be contained within a relatively small enclosure; having a system, as aforesaid, which functions in an extremely efficient manner regardless of the temperature of the outside air; having a system, as aforesaid, which is relatively inexpensive to manufacture and easy to use; and such objects, advantages and capabilities will be readily apparent and better understood from the following description and claims taken in conjunction with the accompanying drawing, in which:

FIG. 3 is a perspective view of the housing apparatus for another embodiment of the invention;

FIG. 4 is a perspective view of the interior portion of the embodiment shown in FIG. 3;

FIG. 5 is a view of several parts comprising the embodiment shown in FIG. 3;

Figure 1:
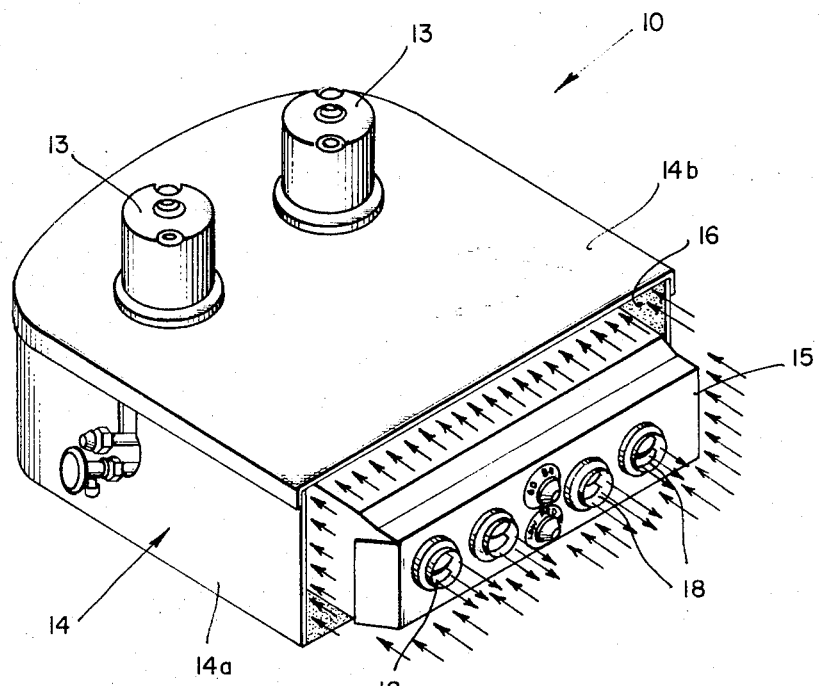
FIG. 1 is a perspective view of the preferred embodiment of the invention, except that the face plate thereof is detached therefrom for illustrative purposes only.
Figure 2:
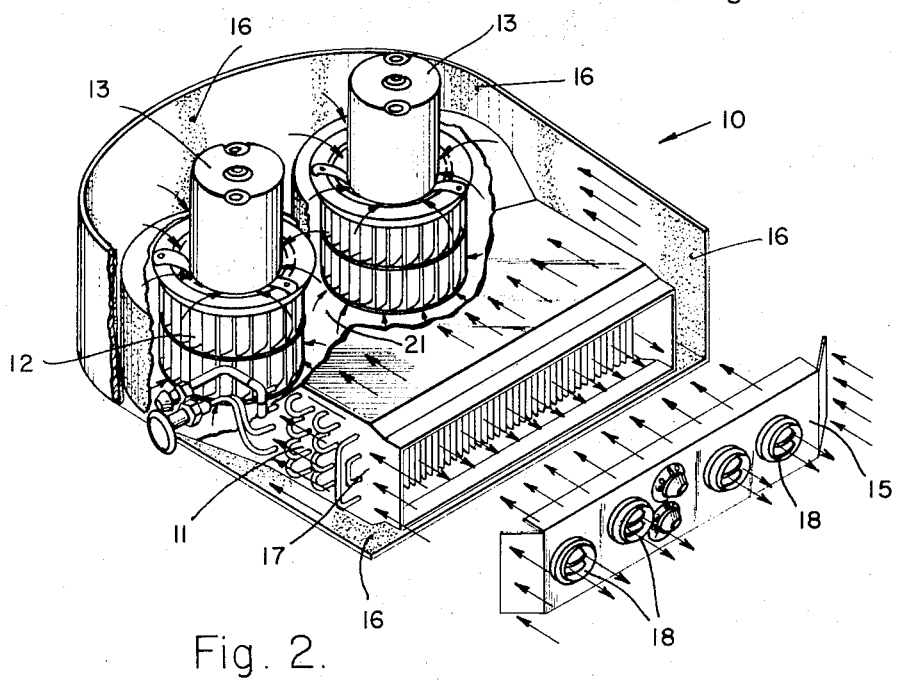
FIG. 2 is a view of the embodiment shown in FIG. 1, except that the top portion of the housing apparatus has been removed for illustrative purposes only.

With reference to the drawing of the invention in detail, and more particularly to FIGS. 1 and 2 thereof, an air conditioning unit embracing the invention herein is shown as 10. Said unit 10 includes, among other things, cooling coils 11, a gas compressor (not shown), a fan 12, and means to drive same 13. Means adapted to expand a refrigerant such as freon or genetron are not shown. In addition to the above, said unit 10 includes a housing apparatus 14 consisting of a sheet metal lower portion 14a, and an upper portion 14b adapted to snugly form a receptacle for the various aforesaid components of said unit 10. As may be appreciated by viewing FIG. 1 of the drawing and as more particularly described hereinbelow, one side of said housing apparatus 14 remains exposed, the same being adapted to receive a face plate 15 thereon. The entire interior surfaces of said housing apparatus 14 and face plate 15 are coated with a thin layer of foam rubber or other insulating material 16.

Figure 6:
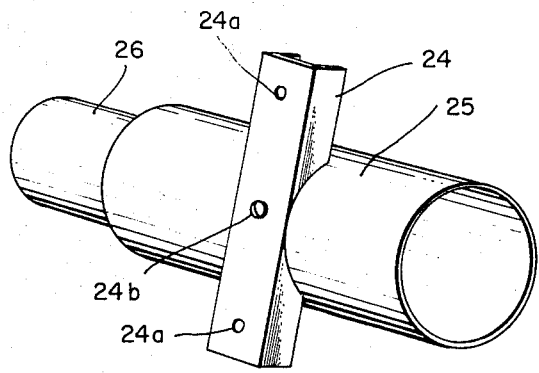
FIG. 6 is a perspective view of the louver mechanism adapted to be placed on an automobile dashboard.
Figure 7:
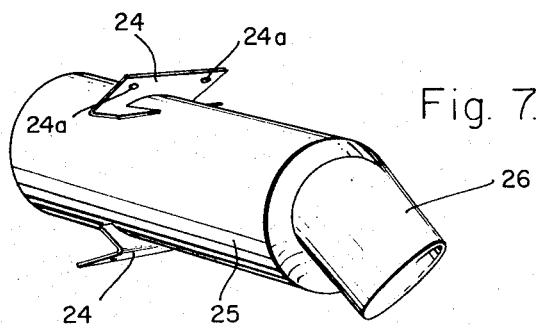
FIG. 7 is a side view of another embodiment of said louver mechanism.
Figure 9:
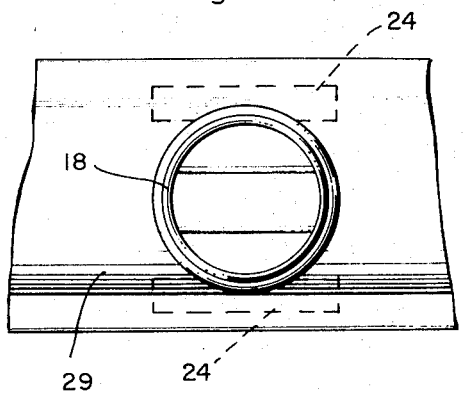
FIG. 9 is a front view of an irregularly shaped automobile dashboard illustrating the embodiment shown in FIG. 7.
Figure 8:
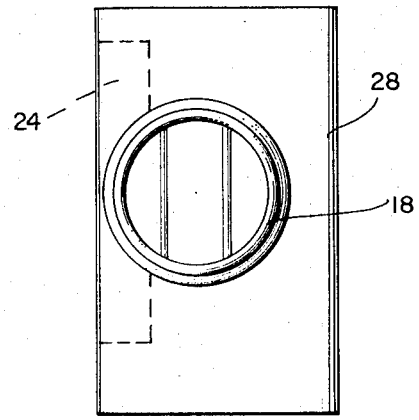
FIG. 8 is a front view of a corner of an automobile dashboard illustrating the embodiment shown in FIG. 6.

In the usual manufacturing process, the coils 11 are covered with sheet steel on two opposite side thereof and are exposed on their remaining sides. Consequently, each of the exposed sides are covered by sheet steel 17 before placement thereof within the said housing apparatus 14. Of course, other materials may be utilized in said invention in lieu of said sheet steel 17 without departing from the spirit or scope of same. Adjustable universal louvers 18 are attached to face place 15 so that conditioned air may be expelled therefrom in the manner hereinafter described. Said louvers 18 are manually adjustable so that the conditioned air being emitted therefrom may be controlled for flow pressure and desired direction. Further, as may be appreciated from viewing FIGS. 8 and 9 of the drawing, a bracket member 24 rigidly connects air outlet cylinders 25 and 26 to an automobile dashboard 29 so that the outlet end thereof may be received by their appropriate louvers 18 at one port thereof. In addition, said louvers 18 are adapted to be attached to face plate 15. As a result, by merely utilizing the appropriate bracket 24, the said air outlet cylinders 25 and 26 and their associated louvers 18 may be fitted in any desired location within an automobile dashboard 29 or otherwise. In FIG. 6 of the drawing, the said bracket is shown as being adapted to fit about cylinder 25 and to connect thereto by means of screw 24b. Once same is accomplished, the bracket is then attached to the dashboard by means of screws 24a. Similarly, in FIG. 7 of the drawing, the irregularly shaped brackets 24 are adapted to accommodate said cylinder 25 and to connect same by means of screws 24a to dashboard 29.

The said system is then installed within said housing apparatus 14 in such a manner that, except for the brackets (not shown) necessary to rigidly affix same to said apparatus 14, the said system does not come in contact therewith. In addition, the said upper portion 14b has two holes provided therein, the same being adapted to receive a fan motor 13 therein. In any event, once installation is completed, the assembly is substantially closed so that uncooled air may be brought into the system only by utilization of fans 12 between said housing apparatus 14 and coils 11 having sheet steel 17 thereabout. Such air is thus first brought into the invention 10, conveyed through said system, and thereafter expelled only through the core 21 of the said coils 11 and the louvers 18.

As may be appreciated by viewing FIG. 2 of the drawing, the fans 12 are provided substantially apart from each other. Thus, the uncooled air is first drawn into the system through space provided between said coils 11 and its side sheet members 17 and the said housing apparatus 14. Since said fans are provided along the rearward edges of said apparatus 14, the said air merely flows about the surfaces of the coils provided within said system. Thus, during such passage, the exterior surfaces of said coils 11 become somewhat warmer and said air becomes cooler. In addition, much of the humidity of such air is removed during such passage by contact with the cold coils 11. In any event, the housing unit 14 is designed in such a manner that the direction of said air is reversed and directed towards the core space 21 provided between said coils 11. Thus, upon return of said pre-cooled air through the core 21 of said coils 11, the conditioning of said air is completed so that upon expulsion thereof through the said adjustable louvers 18, cold air rapidly enters the atmosphere within the room or motor vehicle compartment. As a result of tests performed in connection with the invention 10, it is possible to reduce the temperature within a motor vehicle compartment to at least 40° Fahrenheit, all without formation of frost or "freezing" the said system. Further, less moisture remains in the cooled air because same is substantially removed upon contact with the cooling coils 11. In operation, the said air conditioning system 10 may be inserted within a motor vehicle in any of the usual places therefor inasmuch as it occupies less space than usually required for similar devices. Though not shown, said invention 10 can be installed under the dashboard 29, seat or placed within the trunk of a motor vehicle.

Another embodiment of the invention is shown in FIGS. 3, 4 and 5 of the drawing. Again, two sides of each coil 11 are covered by metal sheets 17 and the remaining sides are covered by similar sheets provided by the manufacturer of such coils 11. In any event, fans 12 placed within the housing apparatus 14 are adapted to blow uncooled air through the top and bottom areas defined by the fan motor 13 and housing apparatus 14. The air, which during the passage along said coils 11 becomes pre-cooled, is thereupon directed to the rearward portion of the housing apparatus 14. The lower portion 14a of said housing apparatus 14 has an aerodynamic scoop 22 provided integral therewith so that such pre-cooled air reverses its direction and proceeds towards and through the core 21 of the coil 11. As a result, the air is finally cooled to the desired temperature just prior to its emission into the atmosphere.

As may be appreciated from above, the aforesaid system is unique in that it initially passes uncooled air over the exterior surfaces of cooling coils for an initial reduction of temperature, and then passes said partially cooled air through the interior core surfaces of such coils for the final temperature reduction before expulsion of same into the surrounding atmosphere.

While only two embodiments of the invention have been described and shown, the present invention is not intended to be restricted to any particular embodiment or any specific useage or any specific combination of elements comprising same, since the said invention may be modified in various particulars or relations without departing from the spirit and scope of the claimed invention hereinabove shown and described of which the embodiment shown herein is intended only for illustration and for disclosure of an operative embodiment, and not to show all of the various forms, modifications or combination of elements in which the invention might be embodied.

I claim:

1. An air conditioning system for vehicles comprising:

an outer casing having an open front end;

an inner casing disposed within said outer casing and spaced therefrom, said space defining an air flow path therebetween;

cooling coils disposed within said inner casing and partially extending into said air flow path;

a face plate disposed in and covering said front end;

circulation means disposed within said outer casing and adjacent said inner casing for drawing uncooled air into said air flow path to reduce the heat and moisture content of said air, and for forcing the drier cooler air across the cooling coils for additional temperature reduction;

means for insulating the interior surfaces of said outer casing and said face plate; and louver members provided on said face plate and adapted to permit the directed explusion of cooled air therefrom into the surrounding atmosphere.

2. The system claimed in claim 1 wherein said louver members are embraced by U-shaped brackets and are positionable in any outlet on any vehicular dashboard regardless of location.

* * * * *